United States Patent [19]

Horie et al.

[11] Patent Number: 4,575,533

[45] Date of Patent: Mar. 11, 1986

[54] THERMOPLASTIC FLUORINE-CONTAINING RESIN BLEND COMPOSITION

[75] Inventors: Shinji Horie; Tetsuji Kakizaki; Toshikazu Mizutani, all of Mie, Japan

[73] Assignee: Mitsubishi Petrochemical Co., Ltd., Tokyo, Japan

[21] Appl. No.: 730,149

[22] Filed: May 3, 1985

[30] Foreign Application Priority Data

Jul. 10, 1984 [JP] Japan .................. 59-142785

[51] Int. Cl.$^4$ .................. C08L 27/14; C08L 27/16; C08L 51/00
[52] U.S. Cl. .................. 525/72; 525/199
[58] Field of Search .................. 525/72

[56] References Cited

U.S. PATENT DOCUMENTS 4,197,380 4/1980 Chao et al. .................. 525/199
4,382,358 5/1983 Tappe et al. .................. 525/72

Primary Examiner—Carman J. Seccuro
Attorney, Agent, or Firm—Sughrue, Mion, Zinn, Macpeak, and Seas

[57] ABSTRACT

1. A thermoplastic fluorine-containing resin blend composition comprising
    (a) from 5 to 95% by weight of a thermoplastic fluorine-containing resin, and
    (b) from 95 to 5% by weight of at least one modified ethylene polymer selected from the group consisting of the following components (i) and (ii).
        (i) A modified ethylene polymer obtained by subjecting an ethylene polymer and an alkyl acrylate to graft reaction conditions, wherein the total alkyl acrylate content including the alkyl acrylate which has been previously contained is from 5 to 70% by weight based on the weight of the modified ethylene polymer;
        (ii) A modified ethylene polymer obtained by subjecting an ethylene polymer having a crystallinity of from 4 to 50% and vinyl acetate to graft reaction conditions, wherein the total vinyl acetate content including the vinyl acetate which has been previously contained is from 5 to 70% by weight based on the weight of the modified ethylene polymer and the boiling xylene insoluble content is 10% by weight or less based on the weight of the modified ethylene polymer.

13 Claims, No Drawings

THERMOPLASTIC FLUORINE-CONTAINING RESIN BLEND COMPOSITION

FIELD OF THE INVENTION

The present invention relates to a resin composition comprising a thermoplastic fluorine-containing resin (hereinafter referred to as "fluorine resin" for brevity) and a specific modified ethylene polymer which are uniformly and finely compatibilized in each other.

The resin composition has excellent electrical characteristics and is suitable for use as various materials for molding.

BACKGROUND OF THE INVENTION

In general, a fluorine resin has an excellent resistance to solvent attach and does not have a water-absorption property. Further, of various synthetic resins, the fluorine resin has very excellent weatherability, heat resistance, abrasion resistance and non-tackiness.

Polytetrafluoroethylene (PTFE) is the representative polymer of the fluorine resin. PTFE is used as a corrosion resistant material for inner lining or packings in pipes of chemical apparatuses from the standpoints of a high heat resistance and an excellent resistance to solvent attack; an insulating material for electric cables from the standpoints of a low dielectric constant and dielectric loss and a high resistivity; and a bearing or sliding material of non-oil supply from the standpoint of an excellent surface lubricating property.

However, since PTFE has a high melting point and it is difficult for PTFE to fuse by heating, the moldability is poor and the molding must be conducted by a sinter molding. Therefore, the moldability of PTFE has been improved by using a copolymer comprising tetrafluoroethylene and a fluorine-containing vinyl monomer other than the tetrafluoroethylene or olefin monomer, or a fluorine resin which does not use tetrafluoroethylene. Thereby, a thermoplastic material having the characteristics of PTFE has been obtained.

On the other hand, the fluorine resin has the above-described excellent characteristics but is expensive, and it is therefore considered that a composite of the fluorine resin and other inexpensive material is useful from the practical standpoint.

However, the fluorine resin has a very low solubility parameter which is the measure for compatibility as compared with other resins and it is difficult for the fluorine resin to compatibilize with other resins. In particular, investigations are not substantially made on the compatibility of the fluorine resin with an olefin polymer which is inexpensive and is widely used and has excellent mechanical characteristics and processability.

A thermoplastic polyurethane or polyalkyl methacrylates are known as a resin having a certain extent of the compatibility with the fluorine resin. However, those resins are expensive as compared with the olefin polymer or show decrease of the tensile elongation which is the important factor as the mechanical characteristics. Thus, those resins are not satisfactory as the materials to be used together with the fluorine resin. Further, there is a method of blending the fluorine resin with a copolymer of an alkyl methacrylate and an olefin, but this method is not general and the effect on the compatibility is not sufficient.

SUMMARY OF THE INVENTION

As a result of extensive investigations to easily compatibilize an ethylene polymer which is inexpensive and is widely used and a fluorine resin, it has been found that such an object can be attained by using a specific modified ethylene polymer.

Accordingly, an object of the present invention is to provide a thermoplastic fluorine-containing resin blend composition comprising (a) from 5 to 95% by weight of a thermoplastic fluorine-containing resin, and
(b) from 95 to 5% by weight of at least one modified ethylene polymer selected from the group consisting of the following components (i) and (ii).
  (i) A modified ethylene polymer obtained by subjecting an ethylene polymer and an alkyl acrylate to graft reaction conditions, wherein the total alkyl acrylate content including any alkyl acrylate which has been previously contained in the ethylene polymer is from 5 to 70% by weight based on the weight of the modified ethylene polymer;
  (ii) A modified ethylene polymer obtained by subjecting an ethylene polymer having a crystallinity of from 4 to 50% and vinyl acetate to graft reaction conditions, wherein the total vinyl acetate content including any vinyl acetate which has been previously contained in the ethylene polymer is from 5 to 70% by weight based on the weight of the modified ethylene polymer and the boiling xylene insoluble content is 10% by weight or less based on the weight of the modified ethylene polymer.

According to the composition of the present invention, the components (a) and (b) are uniformly and finely compatibilized so that the inherent properties of the components (a) and (b) are sufficiently exhibited. Even in the case of molding the composition, layer separation, flow mark and the like do not occur, and the composition is expected to utilize in various field.

Further, surprisingly the composition of the present invention has a larger volume resistivity than that of each of the components (a) and (b), and is therefore suitable for use as a specific coating for electric wire.

DETAILED DESCRIPTION OF THE INVENTION

The fluorine resins as the component (a) which can be used in the present invention are commercially available products and the examples thereof include polyvinyl fluoride, polyvinylidene fluoride, polychlorotrifluoroethylene, ethylene-tetrafluoroethylene copolymer, ethylene-chlorotrifluoroethylene copolymer, tetrafluoroethylene-hexafluoropropylene copolymer, tetrafluoroethylene-propylene copolymer tetrafluoroethylene-perfluoroalkylvinyl-ether copolymer, etc.

Of those resins, polyvinyl fluoride and polyvinylidene fluoride are preferred.

Other polymers which are compatible with the fluorine resin can be blended with fluorine resin.

Example of such a blend is a blend of polyvinylidene fluoride and polymethyl methacrylate. Of course, various inorganic fillers, additives, pigments, etc. which are conventionally blended can be blended with the blend.

The ethylene polymer as the component (b) (i) used in the present invention is an ethylene homopolymer, a copolymer of at least 50% by weight of ethylene and α-olefin having, for example, 3 to 12 carbon atoms (e.g., propylene, butene-1, hexene-1, heptene-1, 4-methylpentene-1 or octene-1), a vinyl ester (e.g., vinyl acetate), an unsaturated carboxylic acid or derivatives thereof (e.g., acrylic acid, methyl acrylate, ethyl acrylate, methyl methacrylate, maleic acid, itaconic acid or maleic anhydride), or an unsaturated organic silane (e.g., vinyl trimethoxysilane, vinyl triethoxysilane or vinyl triacetoxysilane); or an oxidized, chlorinated or saponified product of those polymers. The copolymer used therein includes any random, block and graft copolymers.

Representative examples of the ethylene polymer include a low, medium or high density polyethylene, an ethylene-propylene copolymer, an ethylene-butene copolymer, an ethylene-vinyl acetate copolymer, an ethylene-acrylic acid copolymer, an ethylene-alkyl acrylate copolymer, a maleic anhydride grafted polyethylene polymer, an ethylenevinyl trimethoxysilane copolymer and a γ-methacryloyloxypropyltrimethoxysilane grafted polyethylene.

The ethylene polymer having a crystallinity of 50% or less is preferred.

Of the above ethylene polymers, the ethylenealkyl acrylate copolymer is preferred and the ethylenealkyl acrylate containing at least 15% by weight of alkyl acrylate is particularly preferred.

The ethylene polymer can be used in the form of a powder. However, in view of the handling property in the subsequent mold-processing, it is preferred for the ethylene polymer to be in the form of a particle. Therefore, the particle diameter is a size in such an extent that the particle can be generally used as the material for molding. The particle size is generally from about 1 to 8 mm and preferably from about 3 to 7 mm. The particle diameter does not substantially change before and after modification.

The ethylene polymer can be used alone or as mixtures thereof.

Various additives, inorganic fillers, coloring materials and the like which are added to the conventional resins can be added to the ethylene polymer.

Examples of the alkyl acrylate include methyl, ethyl, propyl or butyl ester of acrylic acid or methacrylic acid. The methyl or ethyl ester is preferred from the standpoint of compatibility.

The alkyl acrylate can be graft copolymerized in the presence of less than 50% by weight based on the total amount of the monomers of other vinyl monomer copolymerizable therewith.

The following effects can be obtained by additionally using such other vinyl monomer.

Use of vinyl esters such as vinyl trialkyl carbonate can increase the alkali resistance. Use of acrylic acid esters having a low glass transition point such as n-butyl acrylate or 2-ethylhexyl acrylate can increase the flowability at low temperature, and when the modified ethylene polymer using the same is blended with other resin, the flowability and softness of the resin can be increased. Use of unsaturated organic acids such as maleic anhydride or acrylic acid can increase the bonding and adhesive properties with polar resins, metals and the like. Use of halogenated unsaturated hydrocarbons such as vinyl chloride or vinylidene chloride can increase the adhesive properties with halogenated resins.

In the graft reaction, the formation of gel in the modified ethylene polymer can be prevented by using from 0.01 to 10% by weight based on the weight of the reactive vinyl monomer of a radical generator and also from 0.01 to 10% by weight based on the weight of the radical generator of a chain transfer agent and from 0.001 to 10% by weight based on the weight of the radical generator of a polymerization inhibitor.

It is preferred that the gel formed in the graft modification is not substantially present. However, if the boiling xylene insoluble component is 10% by weight or less, preferably 1% by weight or less, there are no problems on the mold-processability and blending characteristics.

The boiling xylene insoluble content is measured of the following method.

3.0 g of sample particles are wrapped with a 200 mesh stainless steel net and are extracted with boiling xylene in Soxhlet extractor for 10 hours. The weight proportion of the insoluble content retained in the net to the weight of the sample particles is measured.

The representative embodiment for grafting is a product obtained by grafting an appropriate amount of an alkyl acrylate onto at least one polymer selected from the above-described ethylene polymers or a product obtained by diluting the grafted product with the same or different kind of an ungrafted ethylene polymer.

The grafting method which can be used in the present invention can be any of a solution grafting, a molten grafting, an aqueous suspension grafting, radiation grafting, etc. From the standpoints of a uniform dispersion of the alkyl acrylate and inhibition of gelation, the aqueous suspension grafting as described in U.S. Pat. No. 4,097,554 is preferred. Those grafting methods can be conducted in the conventional methods.

The amount of the alkyl acrylate grafted is that the total alkyl acrylate content including the alkyl acrylate which has been previously contained is from 5 to 70% by weight, preferably from 10 to 65% by weight based on the weight of the modified ethylene polymer. If the amount thereof is less than 10% by weight, the compatibility lacks, and if the amount thereof is more than 70% by weight, the moldability becomes poor.

The modified ethylene polymer has a good mold-processability, an improved temperature dependence of the viscosity and the substantially same crystallization initiating temperature as that of the ethylene polymer so that a thin product such as a film can be easily produced by molding. Further, since the components have a uniform quality, ductility, mechanical strength and the like do not deteriorate.

The modified ethylene polymer (b) (i) can contain other polymers, inorganic fillers, stabilizers, colorant, etc. so long as those materials do not disturb the effect of the present invention. The representative examples thereof are blends of the modified ethylene polymer and an ethylene-vinyl acetate copolymer, an ethylene-ethyl acrylate copolymer or other ethylene polymer.

The ethylene polymer as the component (b) (ii) used in the present invention is an ethylene polymer having a crystallinity of from 4 to 50% and preferably from 10 to 45%. The crystallinity used herein is a value obtained by X-ray analysis method.

The type and shape of the ethylene polymer as the component (b) (ii) are the same as in the ethylene polymer of the component (b) (i). For example, an ethylene homopolymer having a density of 0.923 g/cm$^3$ or less is included therein. Further, in the case of the ethylene copolymer, the crystallinity thereof varies depending on the copolymerized component. For example, in the copolymer of ethylene and vinyl acetate, if the vinyl acetate introduced therein is 8% by weight or more, the crystallinity is 50% or less.

Particularly preferred example is an ethylenevinyl acetate copolymer having the vinyl acetate content of 20% by weight or more.

If the crystallinity is more than 50%, diffusion in the case that vinyl acetate impregnates is difficult and it is difficult to obtain a uniformly graft-modified product. If the crystallinity is less than 4%, the mold processability becomes poor.

The vinyl acetate used in the present invention can be the commercially available products. In addition to this, a mixture of vinyl acetate and 50% by weight or less of other vinyl monomer copolymerizable therewith can also be used.

The graft reaction conditions, formations of gel and the like are the same as in the case of component (b) (i). Further, in this case, the aqueous suspension grafting is preferred from the standpoint of inhibiting formation of gel.

The modified ethylene polymer (b) (ii) obtained by subjecting to such graft reaction conditions is that the total vinyl acetate content including vinyl acetate which has been previously contained in the ethylene polymer is from 5 to 70% by weight and preferably from 10 to 65% by weight based on the weight of the modified ethylene polymer. If the vinyl acetate content is less than 5% by weight, the compatibility lacks and if the vinyl acetate content is more than 70% by weight, the moldability becomes poor.

In the case that the ethylene polymer is an ethylene-vinyl acetate, the amount of vinyl acetate added by the graft reaction conditions is from 3 to 60% by weight, preferably from 5 to 55% by weight and more preferably from 10 to 50% by weight, based on the weight of the modified polymer (b) (ii).

The modified ethylene polymer (b) (ii) can contain other polymers, inorganic fillers, stabilizers, colorants, etc. so long as those materials do not disturb the effect of the present invention. The representative examples thereof are blends of the modified ethylene polymer and an ethylene-vinyl acetate copolymer, an ethylene-ethyl acrylate copolymer or other ethylene polymer.

The modified ethylene polymers (b) (i) and (b) (ii) obtained above have a good mold processability, an improved temperature dependence of viscosity and the substantially same crystallization initiating temperature as in the ethylene polymer so that a thin product such as a film can be easily produced by molding. Further, since the components have the uniform quality, the ductility, mechanical strength and the like do not deteriorate.

The proportions of the component (a) and components (b) (i) and/or (b) (ii) are that the fluorine resin as the component (a) is from 5 to 95% by weight, preferably from 10 to 90% by weight, and the modified ethylene polymer as the components (b) (i) and/or (b) (ii) is from 95 to 5% by weight, preferably from 90 to 10% by weight. If the amount of each component is beyond the above ranges, a uniform composition cannot be obtained.

According to the present invention, the effect which can be expected varies depending on the blending proportion. For example, in the case that the fluorine resin is main and the addition effect of the modified ethylene polymer is sought, the improvement of softness, particularly elongation, is important. On the other hand, is the case that the modified ethylene polymer is main and the fluorine resin is added, the improvement of the heat resistance which is the defect of the modified ethylene polymer is important.

In view of the fact that the fluorine resin and modified ethylene polymer have a good compatibility, the present invention can apply to the laminate of those resins. Further, the present invention can apply to a multi-layer laminate film or sheet using other resin as additional layer(s). In particular, the recycle of burrs is considered in such laminates from the standpoint of the economical property of product. This is very useful in view of the fact that a sufficient compatibility can be obtained in the present invention. In this case, other resin may be added to the modified ethylene polymer or fluorine resin so long as such does not disturb the effect of the present invention.

The present invention will now be explained in greater detail by reference to the following Examples.

REFERENTIAL EXAMPLE 1

A 50 liter autoclave was charged with 20 kg of purified water, 0.6 kg of calcium tertiary phosphate and 0.6 g of sodium dodecylbenzenesulfonate to prepare an aqueous medium. 7 kg of an ethylene-ethyl acrylate copolymer (MFR: 20 g/10 min, ethyl acrylic content: 18% by weight) having a particle diameter of 3 to 4 mm was added to the medium, followed by stirring to suspend.

Separately, 30 g of t-butyl peroxy (2-ethyl hexanoate) was dissolved in 3 kg of ethyl acrylate. The resulting solution was added to the suspension system prepared above.

The atmosphere of the system was replaced by introducing nitrogen into the autoclave. The temperature in the autoclave was elevated to 60° C. and the system was allowed to stand at this temperature for 5 hours while stirring to impregnate ethyl acrylate containing the polymerization initiator into ethylene-ethyl acrylate copolymer particles.

The temperature of the resulting suspension was elevated to 80° C. and the suspension was allowed to stand at this temperature for 5 hours while stirring to conduct polymerization. The temperature was further elevated to 90° C. and the system was maintained for 3 hours to complete the polymerization.

After cooling, the contents were taken off and washed with water to obtain 10 kg of ethyl acrylate-modified ethylene-ethyl acrylate copolymer particles. The ethyl acrylate content in the modified ethylene-ethyl acrylate copolymer obtained was 43% by weight. The boiling xylene insoluble content was 0% by weight.

EXAMPLES 1 TO 5 AND COMPARATIVE EXAMPLES 1 TO 4

The modified ethylene polymer obtained in Referential Example 1 and a polyvinylidene fluoride ("Kynar 720", a product of Pennwalt Co., density: 1.75 g/cc, melting point: 173.7° C.) were mixed in the proportions as shown in Table 1 below and the resulting mixture was melt kneaded and pelletized using a 30 cm twin-screw extruder at 200° C.

The resin composition was sampled and subjected to ion etching to observe the dispersion state using a scanning-type electron microscope. It was observed that the composition showed a uniform dispersion of 1 $\mu$m or less over the entire region.

The evaluation results are shown in Table 1 below.

COMPARATIVE EXAMPLE 5

A low density polyethylene ("Yukalon LM31", a product of Mitsubishi Petrochemical Co., density: 0.918 g/cc, melt flow rate (MFR): 8.0 g/10 min) and the same polyvinylidene fluoride as used in Example 1 were kneaded in the equal weight proportion under the same conditions as in Example 1.

The dispersion state of the resin composition was observed and it was found that the composition showed an ununiform dispersion of about 1 to 50 μm.

The evaluation results are shown in Table 1 below.

COMPARATIVE EXAMPLE 6

The same ethylene-ethyl acrylate copolymer as used in Referential Example 1 and the same polyvinylidene fluoride as used in Example 1 were kneaded in the same manner as in Comparative Example 5.

The dispersion state of the resin composition obtained was observed. The composition showed an ununiform dispersion of about 10 μm.

The evaluation results are shown in Table 1 below.

COMPARATIVE EXAMPLE 7

An ethylene-ethyl acrylate copolymer (ethyl acrylate content: 40 wt %, MFR: 7 g/10 min) and the same polyvinylidene fluoride as used in Example 1 were kneaded in the same manner as in Comparative Example 5. At this time, the ethylene-ethyl acrylate copolymer was heat melted at the resin feed inlet of the extruder and the kneading was not conducted smoothly.

Only a slight amount of the resin composition was obtained and the dispersion state of the composition was observed. The composition showed an ununiform dispersion of about 10 μm.

The evaluation results are shown in Table 1 below.

The evaluations are according to the following methods.

Compatibility
Uniform dispersion of about 1 μm: good
Ununiform dispersion of about 10 μm: poor
Elongation at break
According to JIS K6760.

sulfonate to prepare an aqueous medium. 7 kg of an ethylene-vinyl acetate copolymer ("X-700", a product of Mitsubishi Petrochemical Co., MFR: 30 g/10 min, vinyl acetate content: 33% by weight, crystallinity: 15%) having a particle diameter of 3 to 4 mm was added to the medium and the resulting mixture was stirred to suspend.

Separately, 30 g of t-butyl peroxypivalate and 6.75 g of benzoyl peroxide were dissolved in 3 kg of vinyl acetate. The resulting solution was added to the suspension prepared above.

The atmosphere of the system was replaced by introducing air into the autoclave and a pressure of 0.5 kg/cm$^2$G was applied thereto. The temperature in the autoclave was elevated to 50° C. and the system was allowed to stand at this temperature while stirring to impregnate vinyl acetate containing the polymerization initiator into the ethylene-vinyl acetate particles.

The temperature of the resulting suspension was elevated to 60° C. and the suspension was allowed to stand at this temperature for 5 hours while stirring to conduct polymerization. The temperature was further elevated to 90° C. and the system was maintained for 5 hours to complete the polymerization.

After cooling, the contents were taken out and washed with water to obtain 10 kg of vinyl acetate-modified ethylene-vinyl acetate copolymer particles. The vinyl acetate content in the modified ethylene-vinyl acetate copolymer obtained was 53% by weight. The boiling xylene insoluble content was 0% by weight.

EXAMPLES 6 TO 8 AND COMPARATIVE EXAMPLE 8

The modified ethylene polymer as obtained in Referential Example 2 and the same polyvinylidene fluoride as used in Example 5 were mixed in the proportions as shown in Table 2 below and the resulting mixture was pelletized in the same manner as in Example 1.

The dispersion state of the resin composition obtained

TABLE 1

| | Composition | | | | | | | |
|---|---|---|---|---|---|---|---|---|
| | Modified ethylene polymer (wt %) | Polyvinylidene fluoride (wt %) | Low density polyethylene (wt %) | EEA (EA content: 18 wt %) (wt %) | EEA (EA content: 40 wt %) (wt %) | Melt kneadability | Compatibility | Elongation at break (%) |
| Comparative Example 1 | — | 100 | — | — | — | Easy | — | 60 |
| Comparative Example 2 | 2 | 98 | — | — | — | " | Poor | 60 |
| Example 1 | 5 | 95 | — | — | — | " | Good | 110 |
| Example 2 | 25 | 75 | — | — | — | " | " | 120 |
| Example 3 | 50 | 50 | — | — | — | " | " | 450 |
| Example 4 | 75 | 25 | — | — | — | " | " | 625 |
| Example 5 | 95 | 5 | — | — | — | " | " | 800< |
| Comparative Example 3 | 98 | 2 | — | — | — | " | Poor | 800< |
| Comparative Example 4 | 100 | — | — | — | — | " | — | 800< |
| Comparative Example 5 | — | 50 | 50 | — | — | " | Poor | ~0 |
| Comparative Example 6 | — | 50 | — | 50 | — | " | " | ~0 |
| Comparative Example 7 | — | 50 | — | — | 50 | Difficult | " | ~0 |

EEA: Ethylene-ethyl acrylate copolymer
EA: Ethyl acrylate

REFERENTIAL EXAMPLE 2

A 50 liter autoclave was charged with 20 kg of purified water, 0.6 kg of calcium tertiary phosphate as a suspending agent and 0.6 g of sodium dodecylbenzenewas observed. The composition showed a uniform dispersion of 1 μm or less over the entire region.

The elevation results are shown in Table 2 below.

COMPARATIVE EXAMPLE 9

The same low density polyethylene as used in Comparative Example 5 and the same polyvinylidene fluoride as used in Example 1 were kneaded in the equal weight proportion under the same conditions as in Example 1.

The evaluation results of the resin composition obtained are shown in Table 2 below.

COMPARATIVE EXAMPLE 10

An ethylene-vinyl acetate copolymer ("Evaflex EV 170", a product of Mitsui Polychemical Co., vinyl acetate content: 33 wt % MFR: 1.2 g/10 min) and the same polyvinylidene fluoride as used in Example 1 were kneaded in the same manner as in Comparative Example 8.

The evaluation results of the composition are shown in Table 2 below.

COMPARATIVE EXAMPLE 11

An ethylene-vinyl acetate copolymer containing a large amount of vinyl acetate ("Evaflex 45LX", a product of Mitsui Polychemical Co., vinyl acetate content: 45 wt %, MFR: 5.0 g/10 min) and the same polyvinylidene fluoride as used in Example 1 were kneaded in the same manner as in Comparative Example 8. At this time, the ethylene-vinyl acetate copolymer was heat melted at the resin feed inlet of the extruder and the kneading was not conducted smoothly.

The evaluation results of the composition obtained in a small amount are shown in Table 2 below.

The volume resistivity was measured according to ASTM D257.

TABLE 2

| | Composition | | | | | | | | |
|---|---|---|---|---|---|---|---|---|---|
| | Modified ethylene polymer (wt %) | Polyvinylidene fluoride (wt %) | Low density polyethylene (wt %) | EVA (VA content: 33 wt %) (wt %) | EVA (VA content: 45 wt %) (wt %) | Melt kneadability | Compatibility | Elongation at break (%) | Volume resistivity ($\Omega \cdot cm$) |
| Comparative Example 1 | — | 100 | — | — | — | Easy | — | 60 | $2 \times 10^{14}$ |
| Example 6 | 25 | 75 | — | — | — | " | Good | 100 | $2 \times 10^{15}$ |
| Example 7 | 50 | 50 | — | — | — | " | " | 325 | $6 \times 10^{15}$ |
| Example 8 | 75 | 25 | — | — | — | " | " | 475 | $7 \times 10^{15}$ |
| Comparative Example 8 | 100 | — | — | — | — | " | — | 800< | $5 \times 10^{13}$ |
| Comparative Example 9 | — | 50 | 50 | — | — | " | Poor | ~0 | — |
| Comparative Example 10 | — | 50 | — | 50 | — | " | " | ~0 | — |
| Comparative Example 11 | — | 50 | — | — | 50 | Difficult | " | ~0 | — |

EVA: Ethylene-vinyl acetate copolymer
VA: Vinyl acetate

It is apparent from the results shown in Tables 1 and 2 that the present invention is particularly effective to obtain a composition wherein the components are uniformly and finely compatibilized, having excellent electrical characteristics and good kneadability without deteriortion of mechanical characteristics.

While the invention has been described in detail and with reference to specific embodiments thereof, it will be apparent to one skilled in the art that various changes and modifications can be made therein without departing from the spirit and scope thereof.

What is claimed is:

1. A thermoplastic fluorine-containing resin blend composition comprising
   (a) from 5 to 95% by weight of a thermoplastic fluorine-containing resin, and
   (b) from 95 to 5% by weight of at least one modified ethylene polymer selected from the group consisting of the following components (i) and (ii):
      (i) a modified ethylene polymer containing at least 50% weight ethylene obtained by subjecting an ethylene polymer and an alkyl acrylate to graft reaction conditions, wherein the total alkyl acrylate content is from 5 to 70% by weight based on the weight of the modified ethylene polymer;
      (ii) a modified ethylene polymer containing at least 50% weight ethylene obtained by subjecting an ethylene polymer having a crystallinity of from 4 to 50% and vinyl acetate to graft reaction conditions, wherein the total vinyl acetate content is from 5 to 70% by weight based on the weight of the modified ethylene polymer and the boiling xylene insoluble content is 10% by weight or less based on the weight of the modified ethylene polymer.

2. The composition of claim 1, wherein the fluorine-containing resin is selected from the group consisting of a polyvinyl fluoride and a polyvinylidene fluoride.

3. The composition of claim 1, wherein the fluorine-containing resin is a blend of a polyvinylidene fluoride and a polymethyl methacrylate.

4. The composition of claim 1, wherein the modified ethylene polymer (b) (i) has a crystallinity of 50% or less.

5. The composition of claim 1, wherein the modified ethylene polymer (b) (i) is an ethylene-alkyl acrylate copolymer.

6. The composition of claim 5, wherein the ethylene-alkyl acrylate copolymer contains 15% by weight or more of the alkyl acrylate.

7. The composition of claim 1, wherein the alkyl acrylate is a methyl or ethyl ester of acrylic acid or methacrylic acid.

8. The composition of claim 1, wherein the modified ethylene polymer (b) (i) does not substantially contain a gel.

9. The composition of claim 1, wherein the total alkyl acrylate content in the modified ethylene polymer (b) (i) is from 10 to 65% by weight.

10. The composition of claim 1, wherein the ethylene polymer in the component (b) (ii) has a crystallinity of from 10 to 45%.

11. The composition of claim 1, wherein the ethylene polymer in the component (b) (ii) is an ethylene-vinyl acetate copolymer having the vinyl acetate content of 20% by weight or more.

12. The composition of claim 1, wherein the total vinyl acetate content in the modified ethylene polymer (b) (ii) is from 10 to 65% by weight.

13. The composition of claim 1, comprising
(a) from 10 to 90% by weight of the fluorine resin, and
(b) from 90 to 10% by weight of the modified ethylene polymers (i) and/or (ii).

* * * * *